US007519085B2

United States Patent
Stolyarov et al.

(10) Patent No.: US 7,519,085 B2
(45) Date of Patent: Apr. 14, 2009

(54) CONTROL UNIT FOR TRANSMITTING AUDIO SIGNALS OVER AN OPTICAL NETWORK AND METHODS OF DOING THE SAME

(75) Inventors: Dennis Stolyarov, Northbrook, IL (US); Yuri Stotski, St. Petersburg (RU)

(73) Assignee: Temic Automotive of North America, Inc., Deer Park, IL (US)

(*) Notice: Subject to any disclaimer, the term of this patent is extended or adjusted under 35 U.S.C. 154(b) by 840 days.

(21) Appl. No.: 10/677,910

(22) Filed: Oct. 2, 2003

(65) Prior Publication Data
US 2004/0076435 A1    Apr. 22, 2004

Related U.S. Application Data

(60) Provisional application No. 60/419,367, filed on Oct. 18, 2002.

(51) Int. Cl.
*H04J 3/18* (2006.01)
(52) U.S. Cl. .................... 370/477; 370/478; 398/58; 398/67
(58) Field of Classification Search .............. 370/442, 370/447, 448; 398/56, 67
See application file for complete search history.

(56) References Cited

U.S. PATENT DOCUMENTS 5,231,492 A    7/1993    Dangi et al.

(Continued)

FOREIGN PATENT DOCUMENTS

EP    1 068 997 A    1/2001

(Continued)

OTHER PUBLICATIONS

"Media Oriented Systems Transport: Multimedia and Control Networking Technology—User Manual for MOST PCT104+ Board; Rev.3.0" *Oasis Silicone Systems*, 2001, pp. 1-22.

(Continued)

*Primary Examiner*—Seema S Rao
*Assistant Examiner*—Sai-Ming Chan

(57) ABSTRACT

A system and control unit (26) for transmitting and distributing multiplexed audio data over an optical network (32). The control unit (26) comprises an audio sampler (36), a microcomputer (34), and an optical network interface (40). The audio sampler (36) samples a plurality of electrical signals (42A-D) from transducers (22A-D) and generates a plurality of raw audio data streams (54A-D) from the electrical signals (42A-D). The audio sampler (36) is capable of sampling the electrical signals (42A-D) at a fraction of a frame synchronization rate ($F_s$) of the optical network (32). The microcomputer (34) has an audio processor function (56) and a multiplexer function (58). The audio processor function (56) is capable of processing the raw audio data streams (54A-D) to generate a single processed audio data stream (62) at the frame synchronization rate ($F_s$) of the optical network (32). The multiplexer function (58) is capable of generating a multiplexed audio data stream (66) having a plurality of frames (70). Each frame (70) has a plurality of time division multiplexed channels wherein a first channel within each frame is assigned to transmit the plurality of raw audio data streams (54A-D) and a second channel within each frame is assigned to transmit the processed audio data stream (62). The optical network interface (40) receives the multiplexed audio data stream (66) from the microcomputer (34) and generates an optical multiplexed audio data stream (50) based on the multiplexed audio data stream (66) from the microcomputer (34). There are also methods of transmitting and distributing audio using the above-described system.

34 Claims, 6 Drawing Sheets

U.S. PATENT DOCUMENTS

| | | | |
|---|---|---|---|
| 5,319,707 A * | 6/1994 | Wasilewski et al. | 380/212 |
| 5,388,124 A * | 2/1995 | Laroia et al. | 375/286 |
| 5,666,151 A | 9/1997 | Kondo et al. | |
| 6,009,305 A | 12/1999 | Murata | |
| 6,169,749 B1 | 1/2001 | Dove et al. | |
| 6,356,550 B1 | 3/2002 | Williams | |
| 2002/0067527 A1 | 6/2002 | Akiyama | |
| 2002/0126346 A1 | 9/2002 | Suzuki et al. | |
| 2003/0083024 A1* | 5/2003 | Richenstein et al. | 455/99 |

FOREIGN PATENT DOCUMENTS

| | | |
|---|---|---|
| EP | 1 223 696 A | 7/2002 |
| WO | WO 99/44320 | 9/1999 |
| WO | WO 00/59264 | 10/2000 |
| WO | WO 01/31972 A | 5/2001 |

OTHER PUBLICATIONS

"Media Oriented Systems Transport: Multimedia and Control Networking Technology—MOST Specification Framework; Rev. 1.1" *Oasis Silicone Systems*, 1999, pp. 1-63.

"Media Oriented Systems Transport: Multimedia and Control Networking Technology—OS8104 MOST Network Transceiver; Final Product Data Sheet" *Oasis Silicone Systems*, 2000, pp. 17-25, 41-58, 91-93, and 97-106.

Heck, P. et al.: "Media Oriented Synchronous Transfer—A Network Protocol For High Quality, Low Cost Transfer of Synchronous, Asynchronous, and Control Data on Fiber Optic", Preprints of Papers Presented at the AES Convention, XX, XX, vol. 4551, No. 4551, Sep. 1997, pp. 1-10.

* cited by examiner

| FIFO BUFFER |||
|---|---|---|
| CHANNEL | DATA TYPE | DATA DESCRIPTION |
| 1 | CONTROL | 16-BIT SAMPLE NO. 1 AT $F_s$ RATE |
| 3 | VEHICLE SPEAKER REFERENCE | 16-BIT SAMPLE NO. 1 AT $F_s$ RATE |
| 5 | PROCESSED AUDIO FROM TRANSDUCER ARRAY | 16-BIT SAMPLE NO. 1 AT $F_s$ RATE |
| 7 | AUDIO FROM TRANSDUCER NO. 1 | 16-BIT SAMPLE NO. 1 AT $F_s/4$ RATE |
| 1 | CONTROL | 16-BIT SAMPLE NO. 2 AT $F_s$ RATE |
| 3 | VEHICLE SPEAKER REFERENCE | 16-BIT SAMPLE NO. 2 AT $F_s$ RATE |
| 5 | PROCESSED AUDIO FROM TRANSDUCER ARRAY | 16-BIT SAMPLE NO. 2 AT $F_s$ RATE |
| 7 | AUDIO FROM TRANSDUCER NO. 2 | 16-BIT SAMPLE NO. 1 AT $F_s/4$ RATE |
| 1 | CONTROL | 16-BIT SAMPLE NO. 3 AT $F_s$ RATE |
| 3 | VEHICLE SPEAKER REFERENCE | 16-BIT SAMPLE NO. 3 AT $F_s$ RATE |
| 5 | PROCESSED AUDIO FROM TRANSDUCER ARRAY | 16-BIT SAMPLE NO. 3 AT $F_s$ RATE |
| 7 | AUDIO FROM TRANSDUCER NO. 3 | 16-BIT SAMPLE NO. 1 AT $F_s/4$ RATE |
| 1 | CONTROL | 16-BIT SAMPLE NO. 4 AT $F_s$ RATE |
| 3 | VEHICLE SPEAKER REFERENCE | 16-BIT SAMPLE NO. 4 AT $F_s$ RATE |
| 5 | PROCESSED AUDIO FROM TRANSDUCER ARRAY | 16-BIT SAMPLE NO. 4 AT $F_s$ RATE |
| 7 | AUDIO FROM TRANSDUCER NO. 4 | 16-BIT SAMPLE NO. 1 AT $F_s/4$ RATE |
| 1 | CONTROL | 16-BIT SAMPLE NO. 5 AT $F_s$ RATE |
| 3 | VEHICLE SPEAKER REFERENCE | 16-BIT SAMPLE NO. 5 AT $F_s$ RATE |
| 5 | PROCESSED AUDIO FROM TRANSDUCER ARRAY | 16-BIT SAMPLE NO. 5 AT $F_s$ RATE |
| 7 | AUDIO FROM TRANSDUCER NO. 1 | 16-BIT SAMPLE NO. 2 AT $F_s/4$ RATE |

*FIG.5*

CONTROL UNIT FOR TRANSMITTING AUDIO SIGNALS OVER AN OPTICAL NETWORK AND METHODS OF DOING THE SAME

The present application claims priority from provisional application, Ser. No. 60/419,367, entitled "Control Unit for Transmitting Audio Signals Over an Optical Network and Methods of Doing the Same," filed Oct. 18, 2002, which is commonly owned and incorporated herein by reference in its entirety.

FIELD OF THE INVENTION

This invention in general relates to the transmission of audio signals through a vehicle and, more particularly, to a control unit and method for receiving audio signals from the cabin of the vehicle and transmitting audio signals over an optical network to other audio processing units.

BACKGROUND OF THE INVENTION

Over the past several years, the automotive industry has seen a significant increase in the number of in-vehicle intelligent systems and services. These systems and services are intended to facilitate and improve communication between the user and the vehicle as well as the user and the outside world. For safety reasons, the industry is focused on providing hands-free features to people who use wireless communications in their vehicle. One area that needs improvement is the quality of the voice communication in the vehicle. Efforts to improve the quality of the voice communication has centered on introducing new audio signal processing algorithms, new distributed microphones, and new microphone arrays. To help shield transmitted audio signals from external interference, the industry has introduced an optical network according to a communication protocol known as the Media Oriented Systems Transport or MOST®. Further information about the MOST® optical network protocol may be found on the Internet at www.oasis.com.

Each of these developments has significantly increased the complexity of an audio hands-free communication system. Recently, there has been a need to de-centralize the audio signal processing systems in a vehicle and make units modular in order to improve their performance and reduce cost. This effort has introduced a virtual limit on the number of distributed microphones or microphone array units that can be simultaneously routed or be used by distributed signal processing systems. The primary reason for this limitation is based on the amount of independent audio channels that can be transported over the MOST® optical network communication protocol as well as the variety of sample rates simultaneously supported by these audio streams and rapidly growing system complexity.

Today, in the automotive environment, the MOST® optical network communication protocol has a limit of four independent audio streams (channels) that can be assigned to a control unit that transmits over the optical network. This is primarily due to limitations of current hardware interfaces. Current hardware interfaces sample at the same frequency rate supported by the MOST® optical network communication protocol which is 38 kHz, 44.1 kHz, and 48 kHz. Even though the original design of the MOST® optical network communication protocol supports up to 15 synchronous 4-byte wide audio channels, the interface configuration to the optical network restricts the number of synchronous audio channels that can be assigned to an in-vehicle module. To improve overall user experience and support better quality voice communications, a need exists for additional microphones and microphone arrays. Simply adding additional transducers in known systems, however, will result in a significant cost increase and system complexity.

Accordingly, further improvements are needed to facilitate the transmission of audio signals over current optical network communication protocols. There is also a need to reduce the number of control units in order to reduce cost. It is, therefore, desirable to provide an improved device and procedure for transmitting and distributing audio signals in a vehicle to overcome most, if not all, of the preceding problems.

BRIEF DESCRIPTION OF THE DRAWINGS

FIG. 5 is a diagram illustrating one embodiment of a buffer for multiplexing a stream of audio data;

Figure 1:
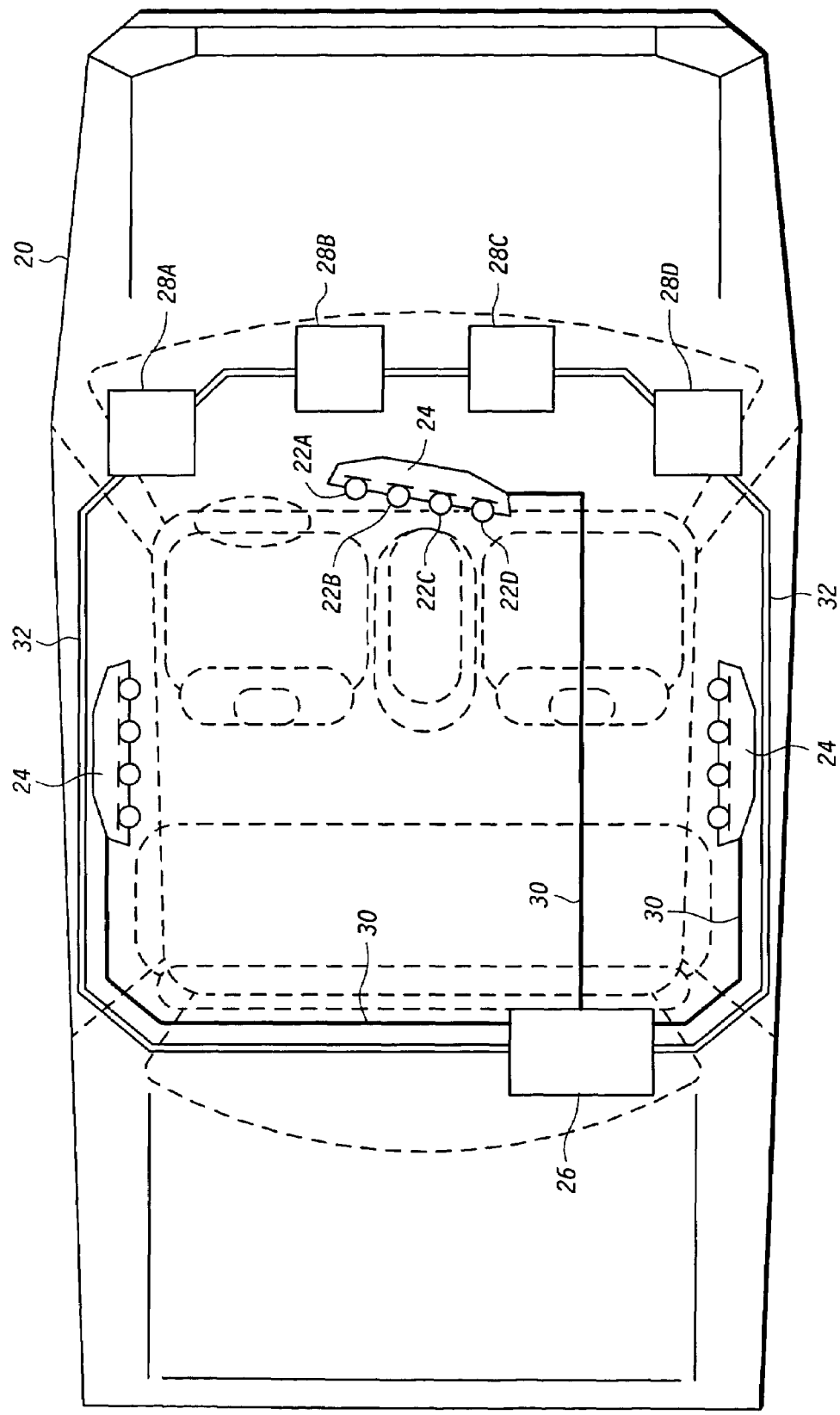
FIG. 1 is a top view of one embodiment of a system architecture for the transmission and distribution of audio signals through a vehicle.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is an improved system and procedure for transmitting audio signals over an optical network. To this end, in one embodiment there is a control unit for transmitting and distributing multiplexed audio data over an optical network. The control unit comprises an audio sampler, a microcomputer, and an optical network interface. The audio sampler samples a plurality of electrical signals from transducers and generates a plurality of raw audio data streams from the electrical signals. The audio sampler is capable of sampling the electrical signals at a fraction of a frame synchronization rate ($F_s$) of the optical network. The microcomputer has an audio processor function and a multiplexer function. The audio processor function is capable of processing the raw audio data streams to generate a single processed audio data stream at or below the frame synchronization rate ($F_s$) of the optical network. The multiplexer function is capable of generating a multiplexed audio data stream having a plurality of frames. Each frame has a plurality of time division multiplexed channels wherein a first channel within each frame is assigned to transmit the plurality of raw audio data streams and a second channel within each frame is assigned to transmit the processed audio data stream. The optical network interface receives the multiplexed audio data stream from the microcomputer and generates an optical multiplexed audio data stream based on the multiplexed audio data stream from the microcomputer.

In one embodiment, the frame synchronization rate ($F_s$) is provided by the optical network interface. The fraction of the frame synchronization rate sampled by the audio sampler may include a variety of rate including one-sixth, one-fourth, one-third and one-half ($F_s/6$, $F_s/4$, $F_s/3$, $F_s/2$). Additionally, the control unit may include a wireless device interface for connecting to a wireless communication device. The microprocessor is capable of receiving audio data from the wireless device interface and generating a downlink audio data stream at or below the frame synchronization rate ($F_s$) of the optical network. The multiplexer function of the microcomputer would then be further capable of generating a multiplexed audio data stream having the plurality of frames wherein a third channel within each frame is assigned to transmit the downlink audio data stream. To help synchronize the raw audio data stream over the optical network, the present invention may further include a procedure for inserting at least two bits within the data sample of the first channel to identify a time slot within the first channel that corresponds to the specific raw audio data stream. Alternatively, the present invention may utilize a separate control channel that would include information to inform secondary audio processing units about the characteristics of the first channel that is transmitting the raw audio data streams.

There is also a control unit for transmitting and distributing multiplexed audio data over an optical network from a first transducer and a second transducer. The control unit comprises an audio sampler, a microcomputer, and an optical network interface. The audio sampler samples a first electrical signal from the first transducer and a second electrical signal from the second transducer. The audio sampler is capable of sampling the first and second electrical signals to generate a first raw audio data stream and a second raw audio data stream. The microcomputer has an audio processor function and a multiplexer function. The audio processor function is capable of processing the first and second raw audio data streams to generate a single processed audio data stream. The multiplexer function is capable of generating a multiplexed audio data stream having a first and second frame. Each frame having a plurality of time division multiplexed channels wherein: a first sample of the first raw audio data stream is transmitted in a first channel during the first frame; a first sample of the processed audio data stream is transmitted in a second channel during the first frame; a first sample of the second raw audio data stream is transmitted in the first channel during the second frame, and a second sample of the processed audio data stream is transmitted in the second channel during the second frame. The optical network interface receives the multiplexed audio data stream from the microcomputer and generates an optical multiplexed audio data stream based on the multiplexed audio stream from the microcomputer.

There is also a system for transmitting and distributing audio data over an optical network in a vehicle. The system comprises a plurality of transducers, a control unit, and a secondary audio processing unit. The plurality of transducers convert sound within a cabin of the vehicle to electrical signals. The control unit has an audio sampler, a microcomputer, and an optical network interface. The audio sampler samples the electrical signals from the plurality of transducers and generates a plurality of raw audio data streams form the electrical signals. The microcomputer has an audio processor function and a multiplexer function. The audio processor function is capable of processing the raw audio data streams to generate a single processed audio data stream. The multiplexer function is capable of generating a multiplexed audio data stream having a plurality of frames, each frame having a plurality of time division multiplexed channels wherein a first channel within each frame is assigned to transmit the plurality of raw audio data streams and a second channel within each frame is assigned to transmit the processed audio data stream. The optical network interface receives the multiplexed audio data stream from the microcomputer and generates an optical multiplexed audio data stream based on the multiplexed audio data stream from the microcomputer. The secondary audio processing unit is connected to the optical network to receive and process the optical multiplexed audio data stream.

In another embodiment, there is a method for transmitting or distributing multiplexed audio data over an optical network. The method comprises the steps of: sampling a plurality of electrical signals from transducers at a fraction of a frame synchronization rate ($F_s$) of the optical network and generating a plurality of raw audio data streams; processing the plurality of raw audio data streams at a frame synchronization rate ($F_s$) of the optical network; multiplexing the plurality of raw audio data streams with the single processed raw audio data stream and generating a multiplexed audio data stream having a plurality of frames, each frame having a plurality of time division multiplexed channels wherein a first channel within each frame is assigned to transmit the plurality of raw audio data streams and a second channel within each frame is assigned to transmit the processed audio data stream; and converting the multiplexed audio data stream into an optical multiplexed audio data stream for transmission over the optical network.

The method may further comprise the steps of: receiving a downlink audio data stream from a wireless communication device; and multiplexing the plurality of raw audio data streams, the single processed raw audio data stream, and the downlink audio data stream, and generating the multiplexed audio data stream having the plurality of frames wherein a third channel within each frame is assigned to transmit the downlink audio data stream. The method may also comprise the steps of: generating a control data stream; and multiplexing the plurality of raw audio data streams, the single processed raw audio data stream, and the control data stream, and generating the multiplexed audio data stream having the plurality of frames wherein a fourth channel within each frame is assigned to transmit the control data stream.

Now, turning to the drawings, an example control unit and method for transmitting audio signals over an optical network will be explained. As will be explained in more detail below, the control unit and method is capable of receiving the sound in a cabin of the vehicle and transmitting the audio signals from the control unit over an optical network to a plurality of secondary audio processing units. Referring to FIG. 1, in one embodiment, a vehicle 20 may have a system comprising a plurality of transducers 22A-D within transducer array 24, a control unit 26, and at least one secondary audio processing unit 28A-D. In this embodiment, the transducer arrays 24 are connected to the control unit 26 through wired connections 30. The control unit 26 and the secondary audio processing units 28A-D are connected through an optical network 32. The optical network 32 shown in FIG. 1 is configured in a ring topology. However, other topologies could be used such as a point-to-point topology and a star topology. The optical network may operate according to known optical communication protocols such as the MOST® optical network communication protocol.

Each transducer array 24 may include a plurality of transducers 22A-D. In FIG. 1, each transducer array 24 is shown to have four transducers 22A-D although a number of other configurations could be used. The transducers 22A-D convert sounds in the cabin of the vehicle 20 to electrical signals. The electrical signals may then be sent to the control unit 26 over wired connections 30. In one embodiment, the electrical signals over the wired connections 30 from the transducers 22A-D are analog signals that are sent to the control unit 26 for processing and routing to the secondary audio processing units 28A-D. The transducers 22A-D may be co-located within the transducer array 24. Alternatively, a plurality of individual transducers could be distributed throughout the cabin of the vehicle 20.

The control unit 26 is described in more detail below. In general, the control unit 26 receives and processes the analog signals from the transducers 22A-D in the transducer arrays 24. In the control unit 26, the received audio signals may be processed for transmission over a wireless communication link for hands-free voice communications during a voice call. Additionally, the control unit 26 may provide audio signals, over the optical network, to the secondary audio processing units 28A-D for further processing. Advantageously, as described in more detail below, the present invention allows the secondary audio units 28A-D the flexibility to choose between receiving raw digital audio data from each transducer 22A-D or processed audio data generated from all the transducers 22A-D.

The secondary audio processing units 28A-D are connected to the optical network 32 and may represent known processing units that perform functions that require audio data from the cabin of the vehicle 20. For instance, one type of secondary audio processing unit may be a unit that handles voice recognition commands. A voice recognition unit identifies voice commands in the digital audio data and process the voice commands such as "place call, 888-555-1234" or "call office." Another type of secondary audio processing unit may be a speech-to-text unit that coverts voice from an occupant in the vehicle 20 to text messages for purposes of generating notes and other memoranda. A further type of secondary audio processing unit may be in-vehicle wireless transceiver unit that receives digital audio data from the cabin of the vehicle 20 and processes the data for transmission over a wireless communication link in a hands-free environment. Yet another type of secondary audio processing unit may be a vehicle audio system that receives downlink audio from the wireless communication device for broadcast over the vehicle speakers.

Figure 2:
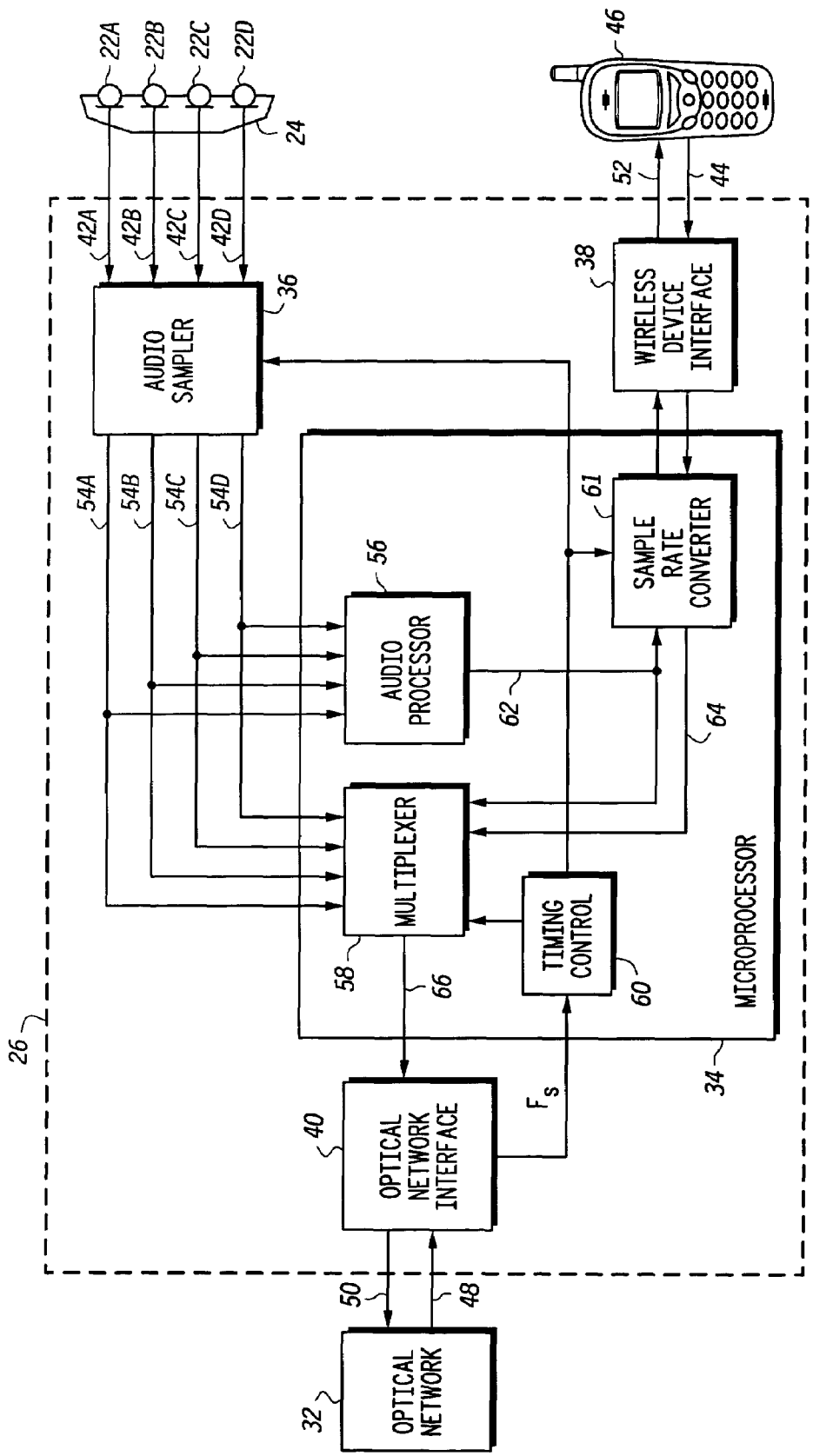
FIG. 2 is a block diagram of one embodiment of a control unit according to the present invention.

Referring to FIG. 2, in one embodiment, a control unit 26 may include a microcomputer 34, an audio sampler 36, a wireless device interface 38, and an optical network interface 40. In this embodiment, the control unit 26 has three inputs: audio signals 42A-42D received from the transducers 22A-22D; downlink audio signals or data 44 received from a wireless communication device 46; and optical data 48 from the optical network 32. With respect to the first input, as mentioned above, the transducers 22A-D may be centrally located within a transducer array 24 or individually distributed through the main cabin of the vehicle 20. With respect to the second input, the wireless communication device 46 may be connected to the control unit 26 through a wired connection or through a short-range wireless connection enabled by techniques such as Bluetooth™. Bluetooth™ technology allows for the replacement of a wired connection by enabling devices to communicate with each other through a universal short-range radio link. A Bluetooth™ specification is available on the Internet from the Bluetooth Special Interest Group (SIG) at www.bluetooth.com. With respect to the third input, the optical network 32 may provide optical data to the control unit 26 for a variety of purposes. For instance, the optical network 32 may provide the control unit 26 with data from the secondary processing units 28A-D for the purposes of broadcasting or transmitting audio to other devices.

The control unit 26 may also have the following outputs: optical audio data 50 that is time multiplexed for distribution over the optical network to the secondary audio processing units 28A-D; and uplink audio signals or data 52 for transmission over a wireless communication link by the wireless communication device 46. With respect to the first output, the output may need to conform to a particular communication protocol such as the MOST® optical network communication protocol. The formation of data for this output is described in more detail below. With respect to the second output, the control unit 26 may be connected to the wireless communication device 46 through a wired connection or through a short-range wireless connection enabled by techniques such as Bluetooth™.

The audio sampler 36 receives the electrical audio signals 42A-D from the transducers 22A-D. For purposes of illustration, the transducers 22A-D will also be referred to as a first transducer 22A, a second transducer 22B, a third transducer 22C, and a fourth transducer 22D. The audio sampler 36 may reside in the control unit 26 or, alternatively, may be a separate unit that provides a series of inputs to the control unit 26. The audio sampler 36 takes samples of the electrical signals 42A-D and converts the electrical signals 42A-D to a format acceptable for further processing in the control unit 26. For example, if the control unit 26 contains a microcomputer 34 with a digital signal processor controller, the electrical signals 42A-D are converted to raw digital audio signals 54A-D. Accordingly, the audio sampler 36 may include components such as amplifiers and analog to digital (A/D) converters.

In one embodiment, the sampling rate of the audio sampler 36 depends on a frame synchronization rate ($F_s$) of the optical network 32. The microcomputer 34 may receive the $F_s$ from the optical network interface 40. The microcomputer 34 may then provide a sampling rate, based on the $F_s$, to the audio sampler 36. In one embodiment, the sampling process may be at fraction of the $F_s$, accepted by the optical network 40. As will be explained in more detail below, depending on the optical network communication protocol, varying the sampling rate in this way provides the advantage of efficiently transmitting audio data from several transducers 22A-D in the cabin of the vehicle 20.

If the optical network is operating according to the MOST® communication protocol, the frame synchronization rate ($F_s$) may be 38 kHz, 44.1 kHz or 48 kHz at a 32-bit resolution. In a system that supports four transducers 22A-D and has an optical network frame synchronization rate of $F_s$=44.1 kHz, the sampling rate may be set in the microcomputer 34 to 11.025 kHz for each A/D converter. This can be done by a timing control 60 in the microcomputer 34. Although the MOST® protocol permits each sample to have a 32-bit resolution, the standard acceptable bit resolution for pulse code modulation (PCM) audio is typically a 16-bit resolution. Accordingly, in a preferred embodiment, the sampling would be done with a 16-bit resolution for each sample within each A/D converter. This would result in 16-bit linear PCM data signal.

The audio sampler outputs four streams of raw digital audio data 54A-D. Each stream of raw digital audio data 54A-D is representative of the four analog signals provided by the transducers 22A-D. The electrical signals 42A-D generated by the transducers 22A-D is a composite of sound components in the cabin of the vehicle 20. The streams of raw digital audio data 54A-D contain this composite of sound components and are provided to the microcomputer 34 for further processing.

The microcomputer 34 in the control unit 26 has the capability of processing the streams of raw digital audio data 54A-D from the audio sampler 36. A suitable microcomputer 34 may be a signal processor controller such as a Motorola MGT 5100. The microcomputer 34 of the present invention preferably includes a number of functional blocks. In one embodiment, the microcomputer 34 has at least the following functional blocks: an audio processor 56, a multiplexer 58, a timing control 60, and a sample rate converter 61. These functional blocks may be microcoded signal processing steps that are programmed as operating instructions in the microcomputer 34.

In particular, the audio processor 56 may be used to generate a single stream of processed audio data 62 from the streams of raw digital audio data 54A-D. In one embodiment, the audio processor uses known algorithms and techniques of adaptive beam forming and adaptive noise reduction. These techniques are known to dynamically adapt the various streams of digital audio data 62 from the transducers 22A-D in the transducer array 24 so that the transducers' pickup pattern can be better directed to the speaker in the vehicle 20. After processing the various streams of raw digital audio data 54A-D, the audio processor 56 generates a single stream of processed digital audio data 62. Depending on the configuration, the single stream of processed digital audio data 62 may be processed by the multiplexer 58 for transmission over the optical network 32 for use by the secondary audio processing units 28A-D or the wireless device interface 38 for transmission of uplink audio over a wireless communication link for use by the wireless communication device 46.

The present invention permits the secondary audio processing units 28A-D the choice of using the single stream of processed audio data 62 generated by the audio processor 56 in the microcomputer 34 or the individual streams of raw digital audio data 54A-D from each of the transducers 22A-D. As described in more below, this benefit is realized through the use of a specific method for multiplexing various streams of audio data over the optical network 32 through the multiplexer 58.

The sample rate converter 61 may be used by the microcomputer 34 to convert external audio samples at one sampling rate to audio samples at another sampling rate. For instance, in some embodiment, the raw downlink audio from a wireless device interface 38 may be at a sampling rate that is different from the frequency synchronization rate ($F_s$) of the optical network 32. A typical sampling rate is about 8 kHz. Accordingly, in one embodiment, the sample rate converter 61 converts the incoming audio data from the wireless device interface 38 to a sampling rate that is based on the frequency synchronization rate ($F_s$) of the optical network 32. The sample rate convert 61 may also convert the outgoing single stream of processed audio data 62 from a sampling rate that is based on the frequency synchronization rate ($F_s$) of the optical network 32 to a sampling rate acceptable for the wireless communication device 46. This will produce a stream of downlink audio data 64 that is used by the multiplexer 58 for transmission to the optical network interface 40 and then to the optical network 32.

The multiplexer 58 receives several sources of audio data that need to be processed for transmission over the optical network 32. For instance, in one embodiment, the multiplexer 58 receives at least six types of audio data: the four streams of raw audio digital data 54A-D from the transducers 22A-D; the single stream of processed audio data 62 from the audio processor 56; and the downlink audio data 64 from the wireless communication device 46. As mentioned above, the four streams of raw audio digital data 54A-D from the transducers 22A-D are preferably in a 16-bit linear PCM data signal that has a sampling rate of 11.025 kHz. The four streams of raw audio digital data 54A-D may be needed by some secondary audio processing units 28A-D that prefer to use their own audio processing algorithms of adaptive beam forming and/or adaptive noise reduction. One type of secondary audio processing unit 28A-D that is known to use its own audio processing algorithms is a voice recognition unit. The single stream of processed audio data 62 may also be a 16-bit linear PCM data signal. However, the sampling rate in one embodiment is set at 44.1 kHz. The single stream of processed audio data 62 may be needed by some secondary audio processing units 28A-D that do not have their own audio processing algorithms such as a speech-to-text unit. The downlink audio data 64 from the rate converter 61 may further be a 16-bit linear PCM data signal having a sampling rate of 44.1 kHz. The downlink audio data 64 may be needed by some secondary audio processing units 28A-D such as the vehicle audio system for broadcasting voice calls over the vehicle speakers.

In one embodiment, to save optical network resources, the multiplexer 58 is configured to combine the four streams of raw audio data 54A-D, the single stream of processed audio data 62, and the downlink audio data 64. In one current optical network communication protocol, the current hardware limitations only allow data to be multiplexed over four channels. The present invention advantageously allows the control unit 26 to transmit the six audio data sources over the four existing channels.

The four streams of raw audio data 54A-D have a sampling rate that is a fraction of the frame synchronization rate ($F_s$) of the optical network 32. In one embodiment, where the frame synchronization rate ($F_s$) is 44.1 kHz, the sampling rate is set at 11.025 kHz for each of the four streams of raw audio data 54A-D. The single stream of processed audio data 62 and the downlink audio data 64 have a sampling rate at the frame synchronization rate ($F_s$) of the optical network, 44.1 kHz.

The multiplexer 58 can be configured in software within the microcomputer 34 to provide an audio interface to the optical network 32 through the optical network interface 40. In one embodiment, the optical network interface 40 is a MOST® Network Transceiver, OS8104, that can be obtained from Oasis Silicon systems AG, Austin, Tex. For purposes of illustration, the function of the multiplexer 58 will be described for use with this transceiver.

In particular, the optical network interface 40 is capable of receiving and transmitting data between external applications and the MOST® network simultaneously. The multiplexer 58 provides the optical network interface 40 with a stream of multiplexed audio data 66. In turn, the optical network interface 40 converts the multiplexed audio data 66 from the microcomputer 34 to optical multiplexed audio data 50.

Figure 3:
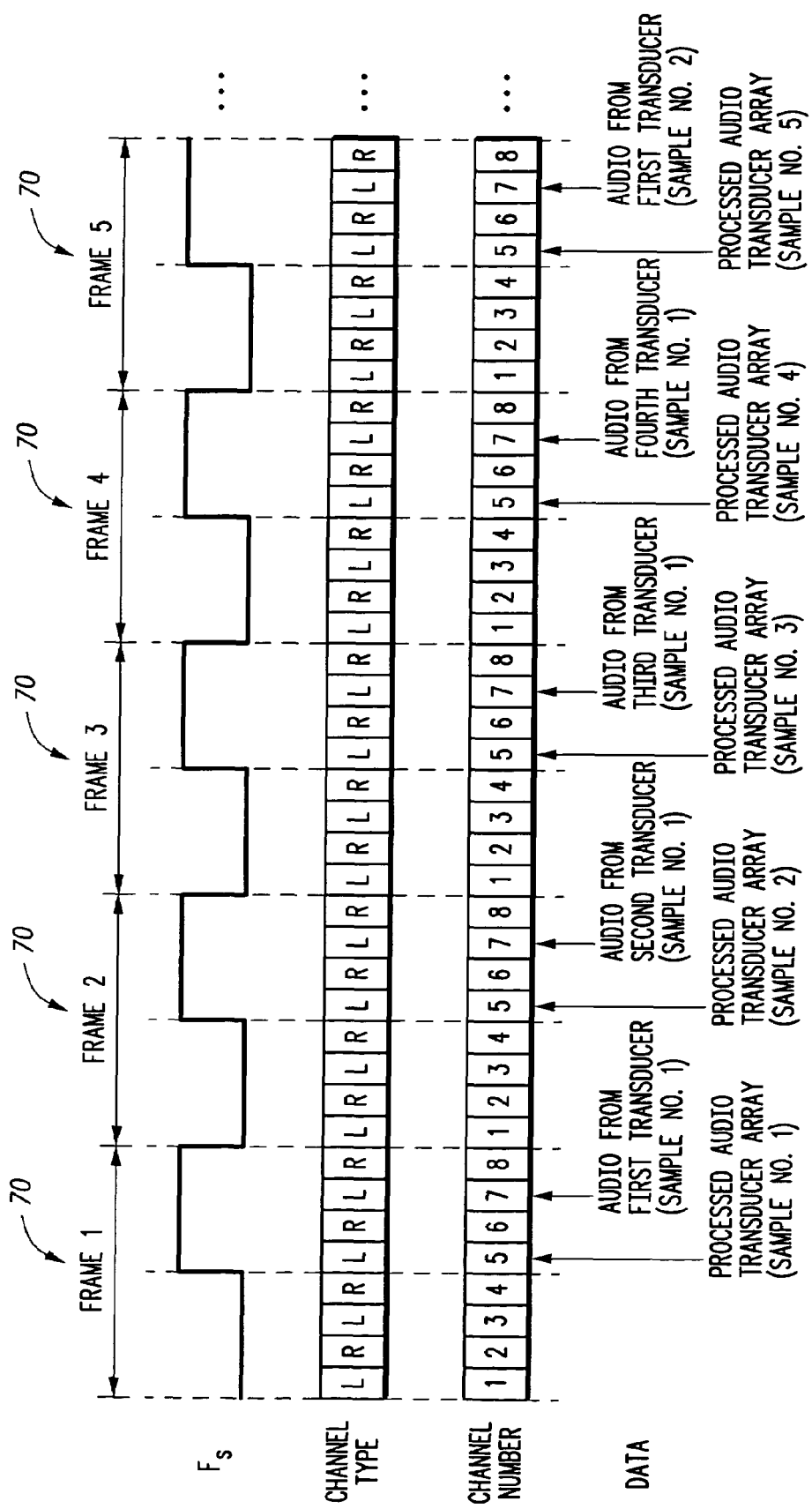
FIG. 3 is a diagram illustrating one embodiment of a sequencing scheme for multiplexing a stream of audio data.
Figure 4:
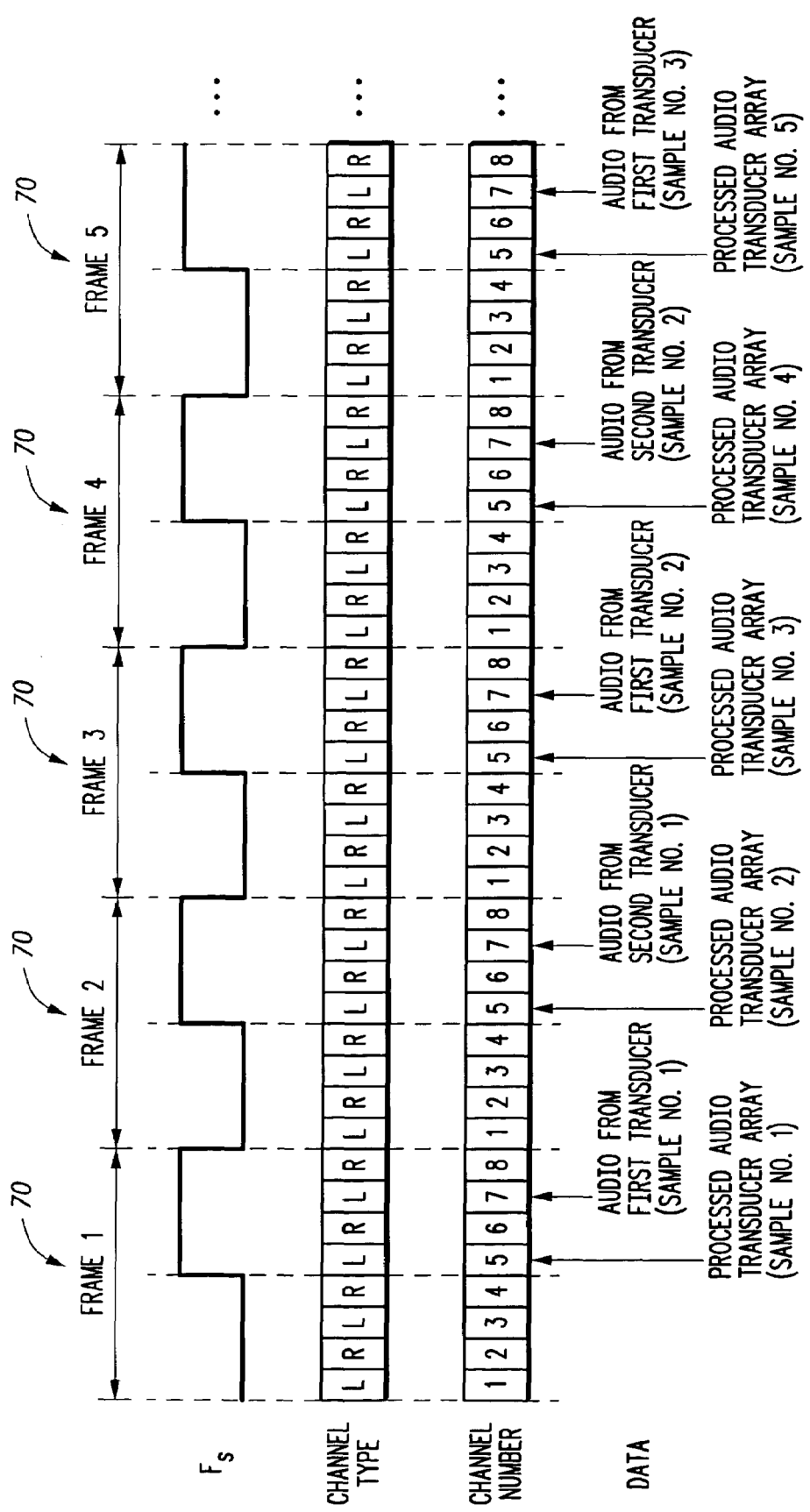
FIG. 4 is a diagram illustrating another embodiment of a sequencing scheme for multiplexing a stream of audio data.

The multiplexer 58 performs a specific time division multiplexing operation to interleave the audio data received from the various audio sources and generate multiplexed audio data 66 to the optical network interface 40. In one embodiment, the time division multiplexing is done in a sequence as shown in FIGS. 3 and 4. FIGS. 3 and 4 show a series of frames 70. For purposes of illustration, five sequential frames are shown: Frame 1, Frame 2, Frame 3, Frame 4, and Frame 5. The size of each frame 70 is set by the frame synchronization rate ($F_s$) that is defined by an optical network communication protocol used by the optical network interface 40.

In one embodiment, the multiplexer 58 configures eight channels within each frame. The size of each channel is based on the frame synchronization rate ($F_s$). In the embodiments shown in FIGS. 3 and 4, some of the channels may be representative of the left channel (L) in an audio stereo system (channels 1, 3, 5, 7). Other channels may be representative of the right channel (R) in an audio stereo system (channels 2, 4, 6, 8). Where the system only needs to transmit audio data in a mono format, only one of the left or right channels may be used. For purposes of illustrating the present invention, the following description will be based on a channel allocation for a mono system using only the left channels (channel 1, 3, 5 and 7).

Each channel may be an audio PCM 16-bit channel that supports PCM data rates according to the frame synchronization rate ($F_s$) of the optical network and according to a fraction of the frame synchronization rate (such as $F_s/2$ or $F_s/4$), depending on the assignment. For example, in one embodiment, a first of four left channels (channel 7) may be assigned to several audio sources to support data at a rate equal to a fraction of the frame synchronization rate ($F_s$). This will enable the first left channel to transmit data samples from more than one audio source. The size of the fraction used to sample the sources for the first left channel will dictate how many audio sources may be transmitted over the fourth left channel. The other three channels (channels 1, 3, and 5) may be assigned to separate sources to support data at a rate equal to the frame synchronization rate ($F_s$) of the optical network.

For instance, as illustrated in FIG. 3, if a first left channel (channel 7) is configured to transmit audio sampled at one-fourth the frame synchronization rate ($F_s/4$) then up to four audio sources having this sampling rate may be time multiplexed on the fourth left channel. The result is a channel assignment that has the four audio sources alternating on a time basis across four frames.

For example, as shown in FIG. 3, the first left channel (channel 7) may be assigned to transmit data for the four streams of raw digital audio data 54A-D from the first transducer 22A, the second transducer 22B, the third transducer 22C, and the fourth transducer 22D. The first sample of the raw digital audio data 54A from the first transducer 22A (sample 1) may be transmitted during Frame 1. The first sample of the raw digital audio data 54B from the second transducer 22B (sample 1) may be transmitted during Frame 2. The first sample of the raw digital audio data 54C from the third transducer 22C (sample 1) may be transmitted during Frame 3. The first sample of the raw digital audio data 54D from the fourth transducer 22D (sample 1) may be transmitted during Frame 4. At Frame 5, the second sample of the raw digital audio data 54A from the first transducer 22A (sample 2) may then be transmitted. This process continues in a time-multiplexed manner.

The multiplexing on a first left channel is different from other channels that may need to be configured at a higher sampling rate. For instance, in FIG. 3, one of the other left channels (such as channel 5) may be configured to support PCM data rates at the frame synchronization rate ($F_s$). For example, channel 5 could be assigned to transmit the processed digital audio data 62 from the audio processor 56 in the microcomputer 34. Here, however, the first sample of the processed digital audio data 62 from microcomputer 34 (sample 1) may be transmitted during Frame 1. The second sample of the processed digital audio data 62 from the microcomputer 34 (sample 2) may be transmitted during Frame 2. The third sample of the processed digital audio data 62 from the microcomputer 34 (sample 3) may be transmitted during Frame 3. The fourth sample of the processed digital audio data 62 from the microcomputer 34 (sample 4) may be transmitted during Frame 4. The fifth sample of the processed digital audio data 62 from the microcomputer 34 (sample 5) may be transmitted during Frame 5. This process continues in a time-multiplexed manner.

Alternatively, as illustrated in FIG. 4, if a first left channel (channel 7) is configured to transmit audio sampled at one-half the frame synchronization rate ($F_s/2$) then up to two audio sources having this sampling rate may be time multiplexed on the channel. Again, if the first left channel (channel 7) is assigned to transmit the raw digital audio data 54A-B, then only two of the raw data streams of the transducers 22A-B could be transmitted over the first left channel. The data from the other two transducers 22C-D could be assigned to another channel in a similar manner. Referring to channel 7, the transmission of the raw digital audio data 54A-B from the first transducer 22A and the second transducer 22B may proceed as follows: The first sample of the raw digital audio data 54A from the first transducer 22A (sample 1) may be transmitted during Frame 1. The first sample of the raw digital audio data 54B from the second transducer 22B (sample 1) may be transmitted during Frame 2. The second sample of the raw digital audio data 54A from the first transducer 22A (sample 2) may be transmitted during Frame 3. The second sample of the raw digital audio data 54B from the second transducer 22B (sample 2) may be transmitted during Frame 4. At Frame 5, the third sample of the raw digital audio data 54A from the first transducer 22A (sample 3) may then be transmitted. This process continues in a time-multiplexed manner.

To perform the time division multiplexing operations, the multiplexer 58 in the microcomputer 34 may work with a FIFO buffer. FIG. 5 shows an embodiment of a buffer 72 that may be used by the multiplexer 58. Here, the buffer 72 stores data according to an assignment scheme that includes the transmission of audio data signals on the left channels in a mono format (channels 1, 3, 5, 7). A variety of ways exist for making the channel assignments. However, in the embodiment shown in FIG. 4, the data type assigned for each channel includes the following format. One of the channels (e.g., Channel 1) may be assigned as a control channel for the transmission of control information that may include data to inform all secondary audio processing units 28A-D on the optical network 32 of the various characteristics and assignments made in other audio channels. Each sample may contain a 16-bit resolution at the frame synchronization rate ($F_s$). Another channel (e.g., Channel 3) may be assigned for the transmission of the downlink audio data 64 from the wireless communication device 46. Each sample may contain a 16-bit resolution at the frame synchronization rate ($F_s$). Another channel (e.g., Channel 5) may be assigned for the transmission of the processed audio data 62 from the audio processor 56 in the microcomputer 34. Each sample may contain a 16-bit resolution at the frame synchronization rate ($F_s$). A further channel (e.g., Channel 7) may be assigned for the transmission of the four streams of raw digital audio data 54A-D from the transducers 22A-D. Each sample may contain a 16-bit resolution but at a fraction of the frame synchronization rate ($F_s/4$).

The present invention also includes a synchronization process for the optical multiplexed data 50 transmitted from the control unit 26 to the secondary audio processing units 28A-D. In the process of transmitting audio signals over the optical network as described above, there is a need for the secondary audio processing units 28A-D to identify and keep track of the raw digital audio data 54A-D interleaved in the optical multiplexed audio data 50.

Figure 6:
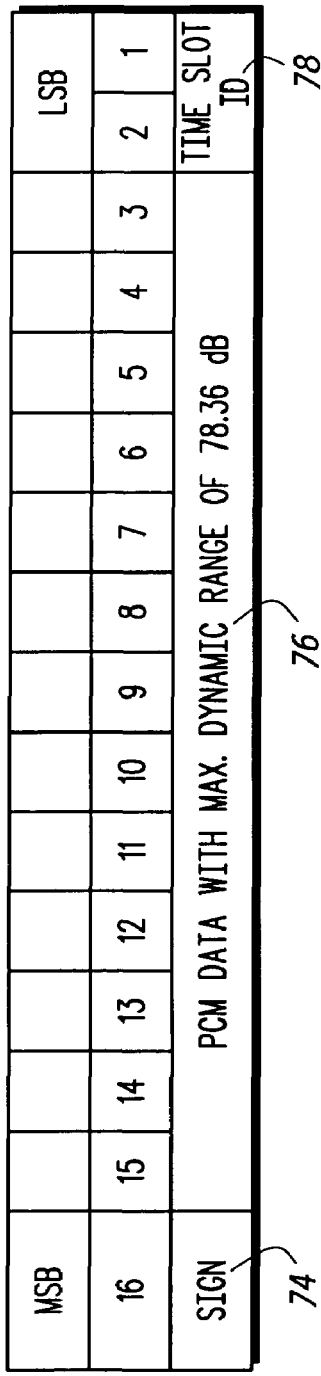
FIG. 6 is a diagram illustrating one embodiment of a 16-bit PCM audio data sample having bits for synchronizing the data with a particular audio source.

In one embodiment, each of the 16-bit PCM data sample may contain a time slot identification number that corresponds to a particular transducer that has data within the channel at the particular time slot. This may be accomplished by assigning at least one least significant bit (LSB) in the 16-bit PCM data sample for the time slot identification as illustrated in FIG. 6. In FIG. 6, in one embodiment, the first bit 74 in the 16-bit PCM data sample is the most significant bit (MSB) representing the sign bit. The next thirteen bits 76 would then represent the PCM data having a maximum dynamic range of 78.36 dB. The last two bits 78 would represent the time slot identification. Alternatively, the identification bits could identify a specific transducer number. In either embodiment, the secondary audio processing units 28A-D could then use the sample structure and format to determine the time slot or transducer number when de-multiplexing the optical multiplexed data 50.

In another embodiment, one of the left channels can be assigned as a control channel (as described above) and a portion of, or the entire width of, the control channel could be used to send information to the secondary audio processing units 28A-D. Information contained in the control channel may include data to inform all secondary audio processing units 28A-D on the optical network 32 of the various characteristics and assignments made within the other audio channels. The information for the control channel may be generated by the microprocessor in a control data stream. If the information within a control data stream cannot fit within a 16-bit sample, the content in the control channel may then be distributed over a number of synchronous audio data frames and reassembled by the secondary audio processing unit 28A-D.

Figure 7:
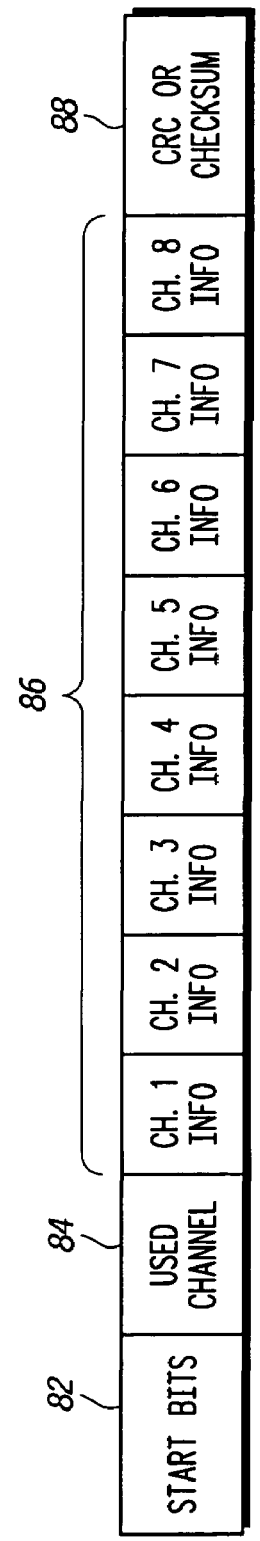
FIG. 7 is a diagram illustrating one embodiment of a data stream for a control channel.

One embodiment of a stream of control data 80 for the control channel is illustrated in FIG. 7. In this embodiment, the stream of control data 80 may include a start bits field 82, a used channel field 84, a series of channel information fields 86, and a CRC or checksum field 88. The start bits field 82 may include a series of bits such as 12 bits that provide a unique pattern that identifies the start of the control channel. The CRC or checksum field 88 can be used according to known means for verifying that the data received has not been corrupted.

The used channel field 84 may contain a series of bits that identifies the number of audio channels being used by the control unit 26. If there are eight channels in a frame as shown in FIGS. 3 and 4, then the used channel field 84 may be 8 bits wide where each bit represents one of the channels. The bit for a particular channel would indicate whether the channel is being used such as 0 for a channel not being used and 1 for a channel being used.

The channel information fields 86 may each contain a series of bits that identifies the information about the type of audio being transmitted over the optical network 32 by the control unit 26. The bits could provide information such as: an audio channel identification; audio type identifier (e.g., raw, processed, stereo, mono, left channel, right channel); channel transmission rate (e.g., 1/2 rate, 1/3 rate, 1/4 rate, 1/5 rate, 1/6 rate); whether the audio is from a single stream or audio from transducer array; transducer array identification; number of audio transducer streams per channel; serial identification of the first transducer in the channel; microphone status (e.g., active, inactive).

What has been described is a system and method for transmitting audio signals over an optical network operating in a protocol such as the MOST® optical network communication protocol. The control unit and method removes the dependency upon a single sample rate and limited number of independent audio channels that currently exist in today's systems. It allows simultaneous transmission of multiple independent microphones or other audio channels to various secondary audio processing units such as a voice recognition unit, a speech-to-text unit, an in-vehicle wireless transceiver, and an audio system for broadcasting audio over the vehicle speakers. The control unit and method permits a single connection point to the optical network of all the distributed microphones, microphone arrays, and other audio based devices in the vehicle. This allows the audio channels from each unit to be transmitted simultaneously over the optical network.

The above description of the present invention is intended to be exemplary only and is not intended to limit the scope of any patent issuing from this application. The present invention is intended to be limited only by the scope and spirit of the following claims.

What is claimed is:

1. A control unit for distributing multiplexed audio data over an optical network, the control unit comprising:
    an audio sampler that samples a plurality of electrical signals from transducers and generates a plurality of raw audio data streams from the electrical signals, the audio sampler capable of sampling the electrical signals at a fraction of a frame synchronization rate ($F_s$) of the optical network;
    a microcomputer having an audio processor function and a multiplexer function, wherein the audio processor function processes the plurality of raw audio data streams to generate a single processed audio data stream from the plurality of raw audio data streams at the frame synchronization rate ($F_s$) of the optical network, and wherein the multiplexer function multiplexes the plurality of raw audio data streams and the single processed audio data stream generated from the plurality of raw audio data streams to generate a multiplexed audio data stream having a plurality of frames, each frame having a plurality of time division multiplexed channels wherein a first channel within each frame is assigned to transmit the plurality of raw audio data streams and a second channel within each frame is assigned to transmit the single processed audio data stream; and
    an optical network interface that receives the multiplexed audio data stream from the microcomputer and generates an optical multiplexed audio data stream based on the multiplexed audio data stream from the microcomputer.

2. The control unit of claim 1, wherein the frame synchronization rate ($F_s$) is provided by the optical network interface.

3. The control unit of claim 2, wherein the fraction of the frame synchronization rate of the optical network sampled by the audio sampler is one-fourth ($F_s/4$).

4. The control unit of claim 2, wherein the fraction of the frame synchronization rate of the optical network sampled by the audio sampler is one-half ($F_s/2$).

5. The control unit of claim 1 further comprising a wireless device interface for connecting to a wireless communication device, the microcomputer capable of receiving audio data from the wireless device interface and generating a downlink audio data stream at the frame synchronization rate ($F_s$) of the optical network, wherein the multiplexer function of the microcomputer further multiplexes the downlink audio data stream to generate the multiplexed audio data stream having the plurality of frames wherein a third channel within each frame is assigned to transmit the downlink audio data stream.

6. The control unit of claim 1, wherein the first channel within each frame contains a data sample, the data sample having at least two bits that identify a time slot within the first channel corresponding to the raw audio data stream.

7. The control unit of claim 1, wherein each frame has at least one channel assigned to transmit control data.

8. The control unit of claim 7, wherein the control data includes information to inform a secondary audio processing unit about the characteristics of the first channel within each frame.

9. A control unit for distributing multiplexed audio data over an optical network from a first transducer and a second transducer, the control unit comprising:
  an audio sampler that samples a first electrical signal from the first transducer and a second electrical signal from the second transducer, and generates a first raw audio data stream and a second raw audio data stream from the first and second electrical signals;
  a microcomputer having an audio processor function and a multiplexer function, wherein the audio processor function processes the first and second raw audio data streams to generate a single processed audio data stream from the first and second raw audio data streams, wherein the multiplexer function multiplexes the first and second raw audio data streams and the single processed audio data stream generated from the first and second raw audio data streams to generate a multiplexed audio data stream having a first and second frame, each frame having a plurality of time division multiplexed channels wherein a first sample of the first raw audio data stream is transmitted in a first channel during the first frame, a first sample of the single processed audio data stream is transmitted in a second channel during the first frame, a first sample of the second raw audio data stream is transmitted in the first channel during the second frame, and a second sample of the single processed audio data stream is transmitted in the second channel during the second frame; and
  an optical network interface that receives the multiplexed audio data stream from the microcomputer and generates an optical multiplexed audio data stream based on the multiplexed audio data stream from the microcomputer.

10. The control unit of claim 9, wherein the audio sampler is further capable of sampling first and second electrical signals at a fraction of a frame synchronization rate ($F_s$) of the optical network.

11. The control unit of claim 10, wherein the frame synchronization rate ($F_s$) is provided by the optical network interface.

12. The control unit of claim 11, wherein the fraction of the frame synchronization rate of the optical network sampled by the audio sampler is one-fourth ($F_s/4$).

13. The control unit of claim 11, wherein the fraction of the frame synchronization rate of the optical network sampled by the audio sampler is one-half ($F_s/2$).

14. The control unit of claim 9 further comprising a wireless device interface for connecting to a wireless communication device, the microcomputer capable of receiving audio data from the wireless device interface and generating a downlink audio data stream, wherein the multiplexer function of the microcomputer further multiplexes the downlink audio data stream to generate the multiplexed audio data stream wherein a first sample of the downlink audio data stream is transmitted in a third channel during the first frame and a second sample of the downlink audio data stream is transmitted in the third channel during the second frame.

15. The control unit of claim 9, wherein the first and second sample of the first raw audio data stream each having at least two bits that the identify a time slot within the first channel that corresponds to the first transducer, the first and second sample of the second raw audio data stream each having has at least two bits that identify a time slot within the first channel that corresponds to the second transducer.

16. The control unit of claim 1, wherein the multiplexer function of the microcomputer further multiplexes a control data stream to generate the multiplexed audio data stream wherein a first sample of the control data stream is transmitted in at least one channel during the first frame and a second sample of the control data stream is transmitted in the at least one channel during the second frame.

17. The control unit of claim 16, wherein the control data includes information to inform a secondary audio processing unit about the characteristics of the first channel within the first and second frames.

18. A system for distributing audio data over an optical network in a vehicle, the system comprising:
  a plurality of transducers convert sound within a cabin of the vehicle to electrical signals;
  a control unit having an audio sampler, a microcomputer, and an optical network interface, wherein:
    the audio sampler samples the electrical signals from the plurality of transducers and generates a plurality of raw audio data streams from the electrical signals;
    the microcomputer has an audio processor function and a multiplexer function, the audio processor function processing the plurality of raw audio data streams to generate a single processed audio data stream from the plurality of raw audio data streams, the multiplexer function multiplexing the plurality of raw audio data streams and the single processed audio data stream generated from the plurality of raw audio data streams to generate a multiplexed audio data stream having a plurality of frames, each frame having a plurality of time division multiplexed channels wherein a first channel within each frame is assigned to transmit the plurality of raw audio data streams and a second channel within each frame is assigned to transmit the single processed audio data stream;
    the optical network interface receives the multiplexed audio data stream from the microcomputer and generates an optical multiplexed audio data stream based on the multiplexed audio data stream from the microcomputer; and
  a secondary audio processing unit connected to the optical network that receives and processes the optical multiplexed audio data stream.

19. The system of claim 18, wherein the audio sampler is further capable of sampling the electrical signals at a fraction of a frame synchronization rate ($F_s$) of the optical network.

20. The system of claim 19, wherein the frame synchronization rate ($F_s$) is provided by the optical network interface.

21. The system of claim 20, wherein the fraction of the frame synchronization rate of the optical network sampled by the audio sampler is one-fourth ($F_s/4$).

22. The system of claim 20, wherein the fraction of the frame synchronization rate of the optical network sampled by the audio sampler is one-half ($F_s/2$).

23. The system of claim 18 further comprising a wireless device interface for connecting to a wireless communication device, the microcomputer capable of receiving audio data from the wireless device interface and generating a downlink audio data stream, the multiplexer function of the microcomputer further multiplexes the downlink audio data stream to generate the multiplexed audio data stream having the plurality of frames wherein a third channel within each frame is assigned to transmit the downlink audio data stream.

24. The system of claim 18, wherein the first channel within each frame contains a data sample, the data sample having at least two bits that identify a time slot that corresponds to the raw audio data stream.

25. The system of claim 18, wherein each frame has at least one channel assigned to transmit control data.

26. The system of claim 25, wherein the control data includes information to inform a secondary audio processing unit about the characteristics of the first channel within each frame.

27. A method for distributing multiplexed audio data over an optical network, the method comprising the steps of:
   sampling a plurality of electrical signals from transducers at a fraction of a frame synchronization rate ($F_s$) of the optical network and generating a plurality of raw audio data streams;
   processing the plurality of raw audio data streams and generating a single processed audio data stream from the plurality of raw audio data streams at a frame synchronization rate ($F_s$) of the optical network;
   multiplexing the plurality of raw audio data streams together with the single processed audio data stream generated from the plurality of raw audio data streams to generate a multiplexed audio data stream having a plurality of frames, each frame having a plurality of time division multiplexed channels wherein a first channel within each frame is assigned to transmit the plurality of raw audio data streams and a second channel within each frame is assigned to transmit the single processed audio data stream; and
   converting the multiplexed audio data stream into an optical multiplexed audio data stream for transmission over the optical network.

28. The method of claim 27, wherein the frame synchronization rate ($F_s$) is provided by an optical network interface.

29. The method of claim 27, wherein the fraction of the frame synchronization rate ($F_s$) of the optical network is one-fourth ($F_s/4$).

30. The method of claim 27, wherein the fraction of the frame synchronization rate ($F_s$) of the optical network is one-half ($F_s/2$).

31. The method of claim 27 further comprising the steps of:
   receiving a downlink audio data stream from a wireless communication device; and
   multiplexing the plurality of raw audio data streams, the single processed audio data stream, and the downlink audio data stream to generate the multiplexed audio data stream having the plurality of frames wherein a third channel within each frame is assigned to transmit the downlink audio data stream.

32. The method of claim 27 wherein the first channel within each frame contains a data sample, the data sample having at least two bits that identify a time slot that corresponds to the raw audio data stream.

33. The method of claim 27 further comprising the steps of:
   generating a control data stream; and
   multiplexing the plurality of raw audio data streams, the single processed audio data stream, and the control data stream to generate the multiplexed audio data stream having the plurality of frames wherein at least one channel within each frame is assigned to transmit the downlink audio data stream.

34. The method of claim 33 wherein the control data stream includes information to inform a secondary audio processing unit about the characteristics of the first channel within each frame.

* * * * *